(12) United States Patent
Ozharar et al.

(10) Patent No.: US 12,460,928 B2
(45) Date of Patent: Nov. 4, 2025

(54) LOW-COST HIGH PRECISION BAROMETRIC PRESSURE MEASUREMENT SYSTEM

(71) Applicant: NEC Laboratories America, Inc., Princeton, NJ (US)

(72) Inventors: Sarper Ozharar, Pennington, NJ (US); Ting Wang, West Windsor, NJ (US); Yue Tian, Princeton, NJ (US); Yangmin Ding, East Brunswick, NJ (US)

(73) Assignee: NEC Corporation, Tokyo (JP)

( * ) Notice: Subject to any disclaimer, the term of this patent is extended or adjusted under 35 U.S.C. 154(b) by 358 days.

(21) Appl. No.: 18/319,463

(22) Filed: May 17, 2023

(65) Prior Publication Data

US 2023/0375342 A1      Nov. 23, 2023

Related U.S. Application Data

(60) Provisional application No. 63/343,614, filed on May 19, 2022.

(51) Int. Cl.
*G01C 5/06*        (2006.01)
*G01K 11/3206*     (2021.01)
*G01K 11/22*       (2006.01)

(52) U.S. Cl.
CPC ............ *G01C 5/06* (2013.01); *G01K 11/3206* (2013.01); *G01K 11/22* (2013.01)

(58) Field of Classification Search
CPC ........ G01C 5/06; G01C 25/00; G01C 22/006; G01C 21/206; G01C 21/20; G01C 21/165;
(Continued)

(56) References Cited

U.S. PATENT DOCUMENTS 9,612,114  B2 *  4/2017  Wachter .................. G01C 5/06
10,309,775 B2 *  6/2019  MacGougan ........... G01C 5/06
(Continued)

FOREIGN PATENT DOCUMENTS

CN   118565712 A  *  8/2024  .......... G01L 27/005
EP   3066442 A1   *  9/2016
(Continued)

*Primary Examiner* — Andre J Allen
(74) *Attorney, Agent, or Firm* — Joseph Kolodka; Vincent Duffy (57) ABSTRACT

Disclosed are systems and methods to determine barometric pressure 1) using multiple low-cost pressure sensors located at known heights instead of a single high-cost sensor; 2) determines an actual pressure value—not by averaging multiple sensors but rather optimizing an expected error in each individual one of them and utilize their known sensor heights thereby defining a new error function; 3) our approach is scalable, i.e. the number of sensors can be increased, and multiple sensors can be grouped together into smaller cells such that each group of cell can be corrected separately, and can even be corrected among themselves. Finally, our systems and methods according to the present disclosure can advantageously be integrated with a distributed fiber optic sensing (DFOS) system via acoustic modems thereby providing extremely wide-area external, or interior buildings pressure readings.

4 Claims, 7 Drawing Sheets

(58) Field of Classification Search
CPC .... G01C 21/005; G01C 25/005; G01C 5/005; G01C 21/1656; G01C 21/1654; G01C 5/00; G01C 21/188; G01C 17/38; G01C 23/00; G01C 21/28; G01C 21/1652; G01C 21/16; G01C 21/12; G01C 15/002; G01C 19/00; G01C 21/18; G01C 21/3602; G01C 21/08; G01C 22/00; G01C 21/10; G01C 21/3461; G01C 19/5776; G01C 21/3848; G01C 21/203; G01C 21/3415; G01C 9/00; G01C 19/02; G01C 21/3697; G01C 15/00; G01C 21/30; G01C 21/36; G01C 21/183; G01C 21/34; G01C 21/26; G01C 9/06; G01C 21/00; G01C 21/185; G01C 13/008; G01C 21/166; G01C 7/04; G01C 11/02; G01C 11/34; G01C 22/002; G01C 17/02; G01C 17/28; G01C 21/3617; G01C 21/3629; G01C 3/08; G01C 13/00; G01C 19/5769; G01C 21/383; G01C 3/00; G01C 21/265; G01C 21/3438; G01C 21/3469; G01C 21/3804; G01C 9/02; G01C 17/30; G01C 5/04; G01C 19/005; G01C 21/3885; G01C 17/00; G01C 19/32; G01C 21/04; G01C 21/3844; G01C 13/004; G01C 19/42; G01C 21/3815; G01C 23/005; G01C 11/00; G01C 11/04; G01C 9/18; G01C 19/5712; G01C 21/3407; G01C 21/343; G01C 9/12; G01C 21/14; G01C 21/32; G01C 21/3423; G01C 21/3484; G01C 21/3647; G01C 21/3676; G01C 21/387; G01C 9/22; G01C 1/00; G01C 2009/066; G01C 21/3691; G01C 11/08; G01C 15/06; G01C 19/5607; G01C 19/5614; G01C 19/5783; G01C 21/3492; G01C 21/3841; G01C 3/02; G01C 3/085; G01C 11/06; G01C 19/24; G01C 19/58; G01C 19/662; G01C 21/3453; G01C 21/362; G01C 7/02; G01C 19/56; G01C 19/72; G01C 21/3664; G01C 22/025; G01C 11/36; G01C 13/002; G01C 19/5656; G01C 19/5719; G01C 19/727; G01C 21/365; G01C 21/3658; G01C 21/3661; G01C 21/3667; G01C 21/367; G01C 21/3682

See application file for complete search history.

(56) References Cited

U.S. PATENT DOCUMENTS

| | | | | |
|---|---|---|---|---|
| 2016/0102995 | A1* | 4/2016 | Gum | H04W 4/029 |
| | | | | 702/98 |
| 2019/0094379 | A1* | 3/2019 | Chhokra | G01S 19/40 |
| 2022/0317309 | A1* | 10/2022 | Gamble, Jr. | G01C 5/00 |
| 2025/0198801 | A1* | 6/2025 | Trifilo | G01C 25/00 |

FOREIGN PATENT DOCUMENTS

| | | | | | |
|---|---|---|---|---|---|
| JP | | 6370333 | B2 * | 8/2018 | |
| JP | | 2020530114 | A * | 10/2020 | G01L 19/02 |
| WO | WO-2010150117 | A1 * | 12/2010 | A61B 5/1117 |
| WO | WO-2019069665 | A1 * | 4/2019 | G01C 5/06 |

* cited by examiner

LOW-COST HIGH PRECISION BAROMETRIC PRESSURE MEASUREMENT SYSTEM

CROSS-REFERENCE TO RELATED APPLICATIONS

This application claims the benefit of U.S. Provisional Patent Application Ser. No. 63/343,614 filed May 19, 2022, the entire contents of which is incorporated by reference as if set forth at length herein.

FIELD OF THE INVENTION

This application relates generally to barometric pressure sensing and more particularly to a low-cost, high precision barometric pressure measurement system that may advantageously and optionally be integrated into a distributed fiber optic sensing (DFOS) system using an acoustic modem.

BACKGROUND OF THE INVENTION

Precise barometric pressure measurements are known to have applicability to a number of applications in addition to those weather-related. For example, a precise barometric pressure measurement may provide the altitude (height) of something or someone with a precision that is unavailable with other technologies such as global positioning systems (GPS). Such precision may be critically important in applications including E911 (Enhanced 911) services—where a particular floor of a caller in a large high-rise structure is required and unavailable by other means.

SUMMARY OF THE INVENTION

An advance in the art is made according to aspects of the present disclosure directed to a novel method to determine barometric pressure at a location that may be used to determine a more exact location in 3-Dimensions of—for example—an E911 caller. The barometric pressure at the caller's location is determined with a built-in sensor of a cellular telephone—as referenced by our inventive barometric pressure references that advantageously determine the barometric pressure at a number of known altitudes, thereby providing a known reference and 3D accuracy to the caller's cellular telephone measurement.

In contrast to the prior art, our inventive systems and methods: 1) using multiple low-cost pressure sensors located at known heights instead of a single high-cost sensor; 2) determines an actual pressure value—not by averaging multiple sensors but rather optimizing an expected error in each individual one of them and utilize their known sensor heights thereby defining a new error function; our approach is scalable, i.e. the number of sensors can be increased, and multiple sensors can be grouped together into smaller cells such that each group of cell can be corrected separately, and can even be corrected among themselves.

Finally, our systems and methods according to the present disclosure can advantageously be integrated with a distributed fiber optic sensing (DFOS) system via acoustic modems thereby providing extremely wide-area external, or interior buildings pressure readings.

DETAILED DESCRIPTION OF THE INVENTION

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1A:
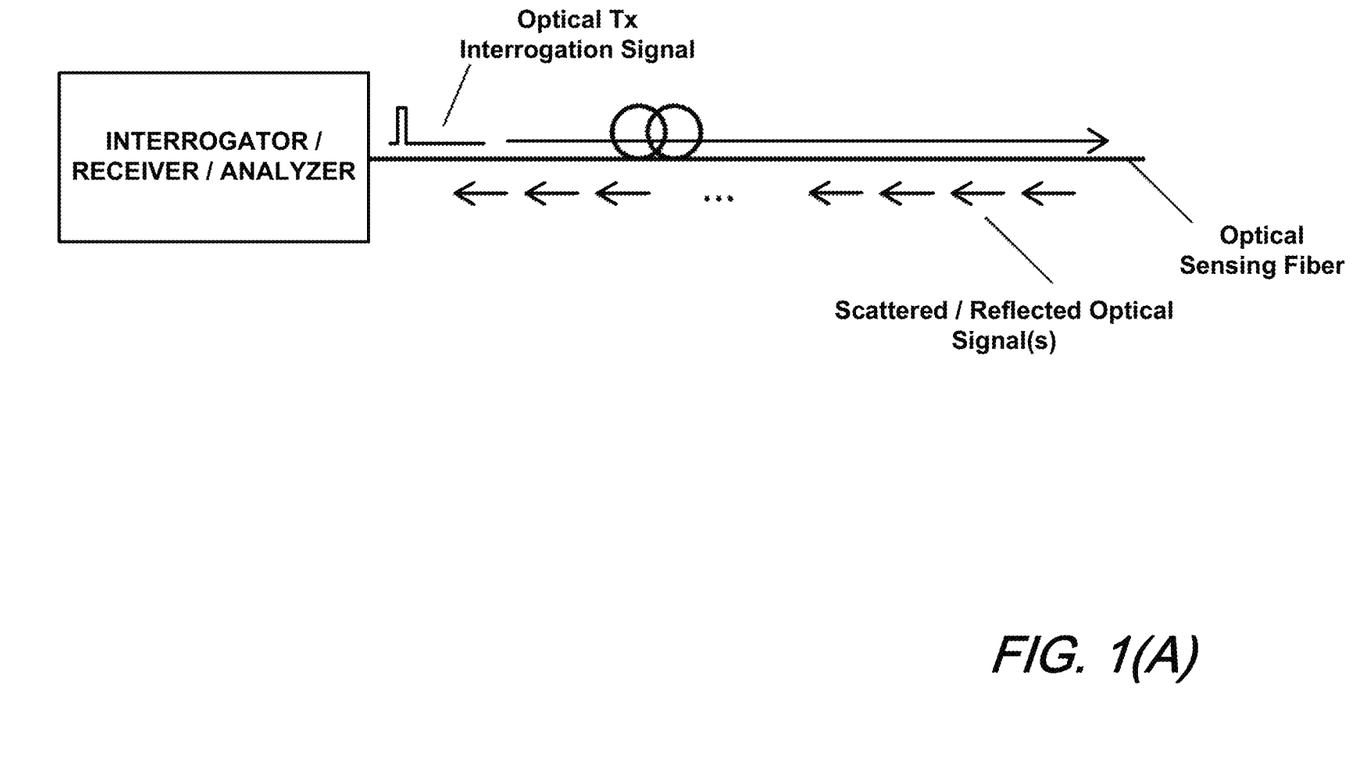
FIG. 1(A) and FIG. 1(B) are schematic diagrams showing an illustrative prior art uncoded and coded DFOS systems.
Figure 1B:
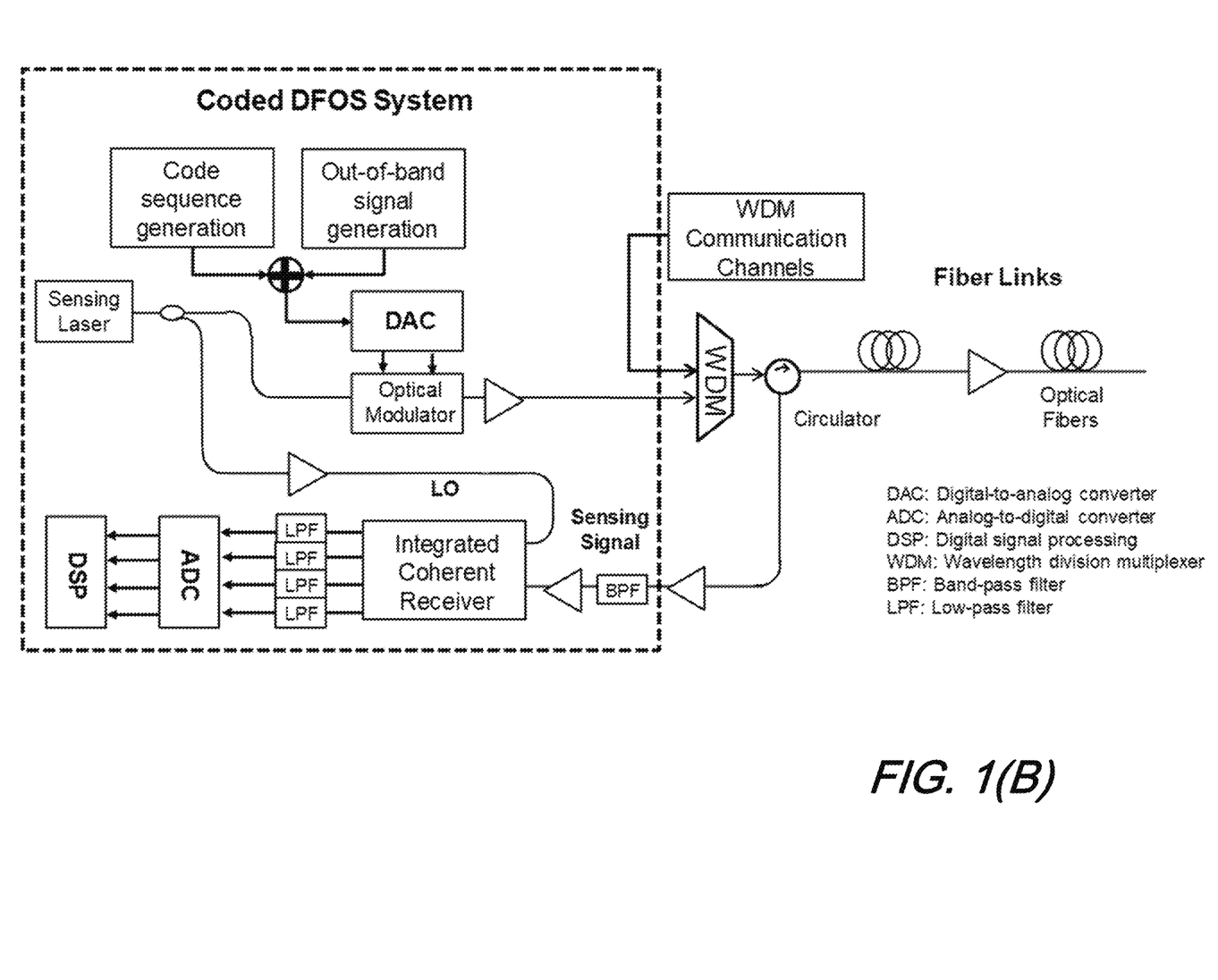

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
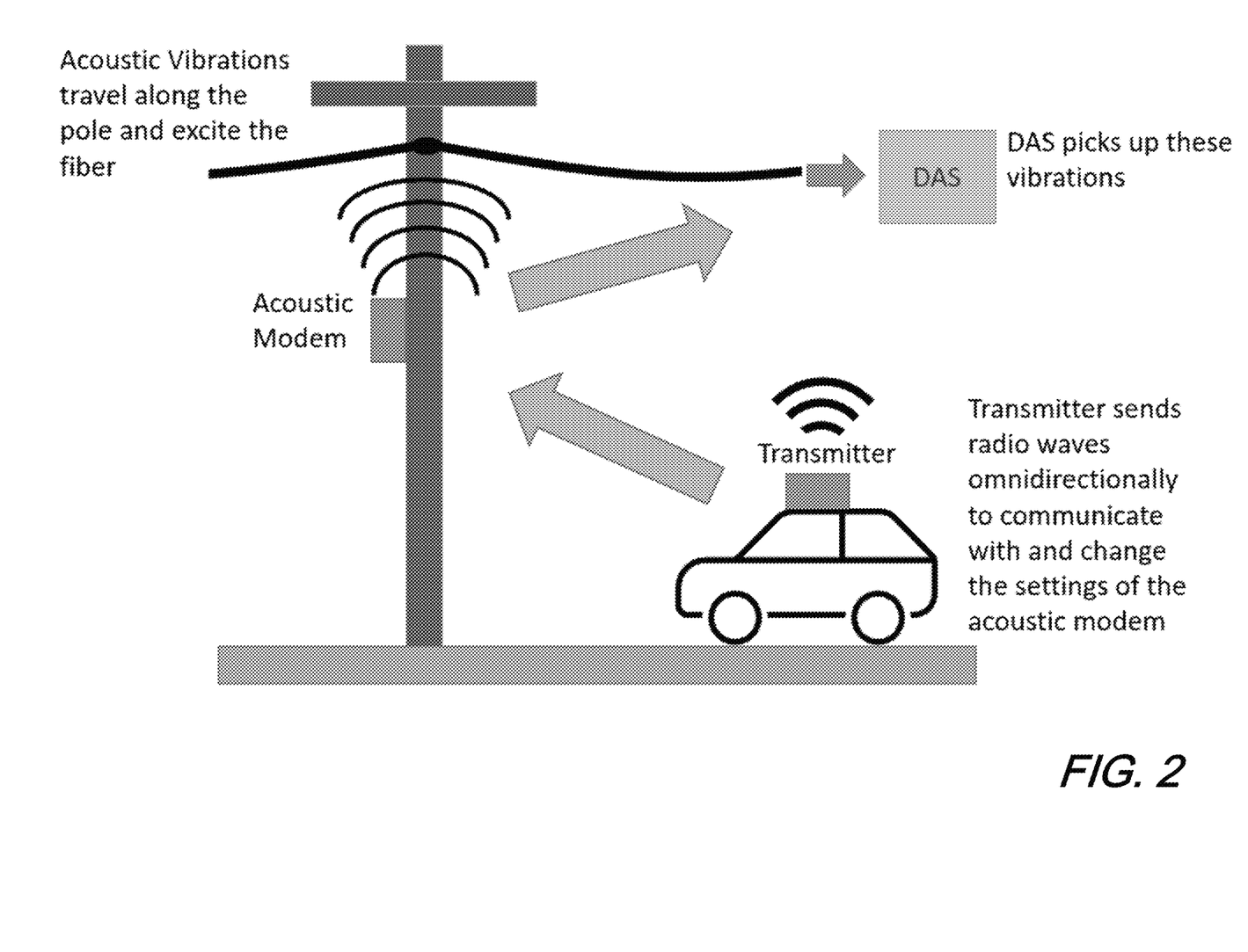
FIG. 2. is a schematic diagram showing an illustrative utility pole suspending a length of fiber optic sensor cable as part of a distributed fiber optic sensor (DFOS) system in which an acoustic modem is imparting vibrations to fiber optic sensor that is subsequently detected and analyzed by the DFOS system according to aspects of the present disclosure.

FIG. 2. is a schematic diagram showing an illustrative utility pole suspending a length of fiber optic sensor cable as part of a distributed fiber optic sensor (DFOS) system in which an acoustic modem is imparting vibrations to fiber optic sensor that is subsequently detected and analyzed by the DFOS system according to aspects of the present disclosure. As illustratively shown in this figure, the acoustic modem produces vibrations that in turn cause vibrations in the optical fiber sensor that may be detected by the DFOS system. As those skilled in the art will readily appreciate, such operation may serve as a mechanism by which our inventive barometric pressure measurements may be conveyed to a more central location for analysis.

Figure 3:
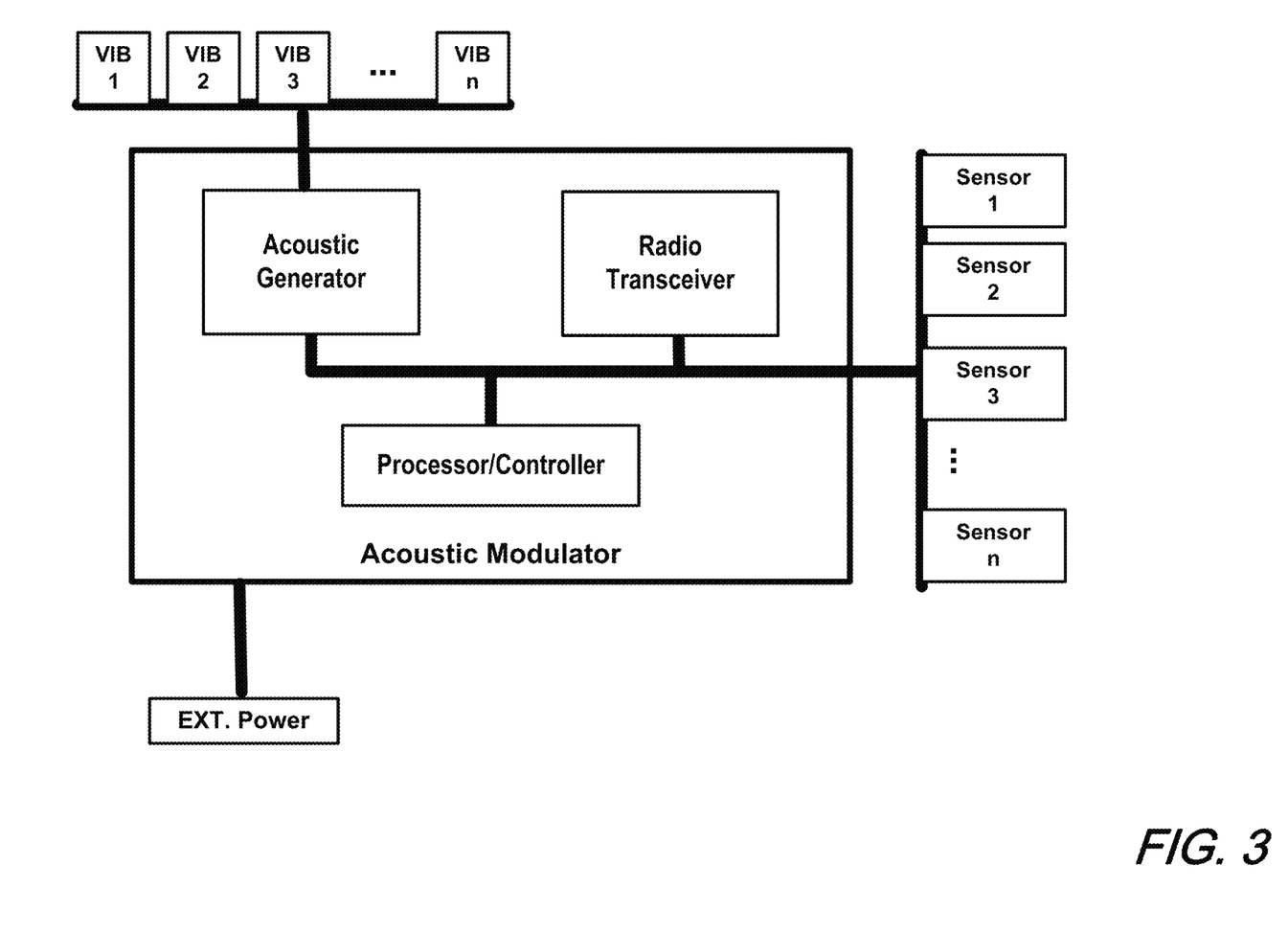
FIG. 3 is a schematic diagram of an illustrative acoustic modem including multiple sensors and vibrators according to aspects of the present disclosure.

FIG. 3 is a schematic diagram of an illustrative acoustic modem including multiple sensors and vibrators according to aspects of the present disclosure. As shown in this figure, an acoustic modem—such as that shown in FIG. 2, may include a radio transceiver, acoustic generator, control processor, a number of sensors and a one or more vibrator elements. Operationally, in response to any sensor information sensed by one or more of the sensors, the processor/controller may use that information to generate an acoustic/vibration that is conveyed to the optical fiber sensor and detected by the DFOS. In the situation described herein, where the sensors are high precision barometric sensors, barometric pressure readings may be sensed, converted to acoustic vibrations, conveyed to an optical sensing fiber, and detected by DFOS.

Figure 4:
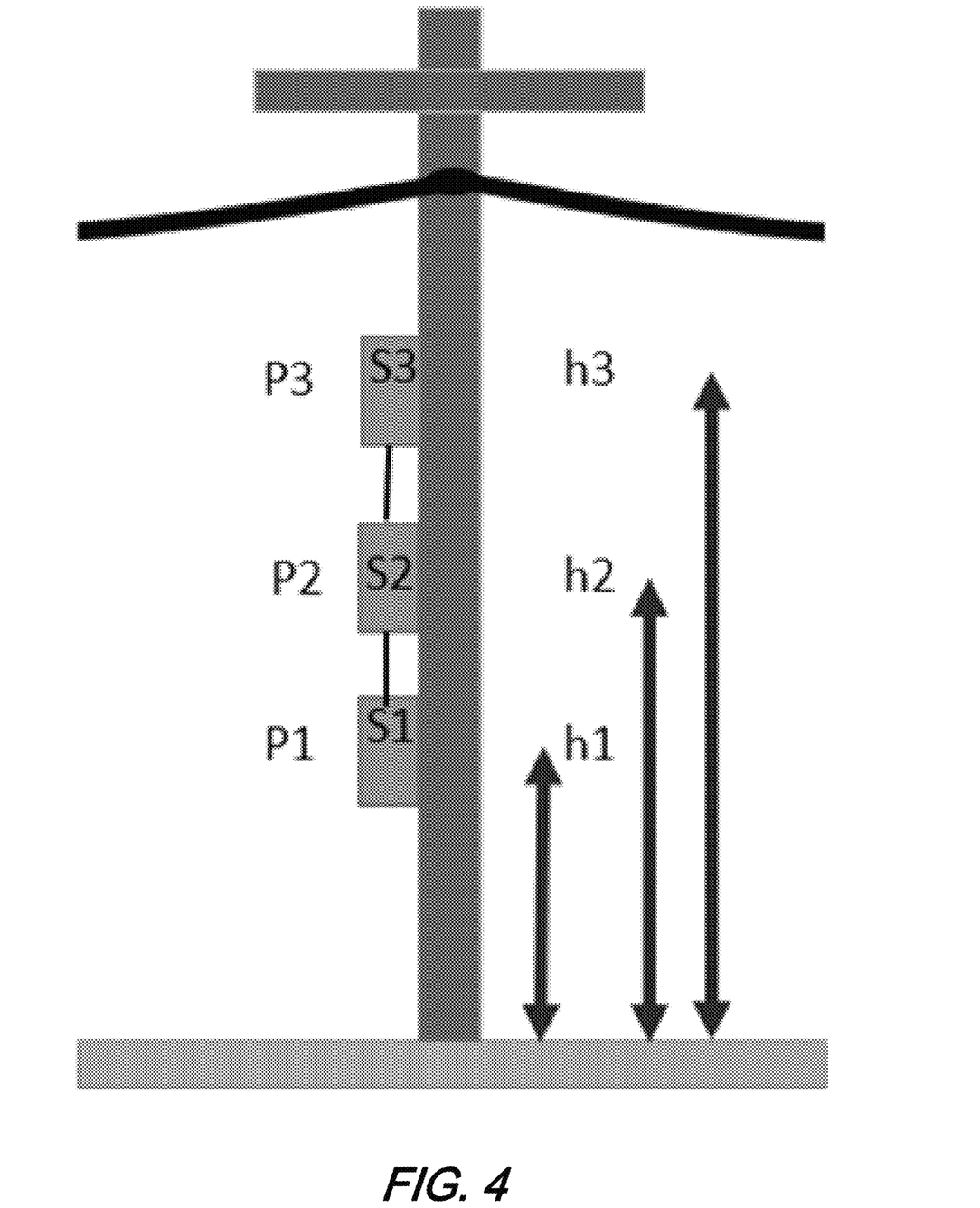
FIG. 4 is a schematic diagram showing an illustrative utility pole having a suspended fiber optic cable and at least three pressure sensors positioned to the pole at different heights according to aspects of the present disclosure.

FIG. 4 is a schematic diagram showing an illustrative utility pole having a suspended fiber optic cable and at least three pressure sensors positioned to the pole at different heights according to aspects of the present disclosure. In this illustrative figure, a series of sensors (S1, S2, and S3) are shown at three separate, respective positions on a utility pole namely, P1, P2, and P3. Each of the positions is located at a different height from ground namely, h1, h2, and h3. As such, each of the three sensors S1, S2, and S3 will record a different barometric pressures indicative of their different heights. Such barometric pressures may be conveyed for analysis/use via DFOS as described previously. Since the heights of the individual sensors S1, S2, and S3, are known, a relationship between the barometric pressure(s) and different heights may be made.

As previously noted, one aspect of the present disclosure is highly accurate barometric pressure results obtained from multiple low-cost sensors, keeping the overall device and maintenance costs low and the results at high accuracy.

There is a known relation between the barometric pressure at a point and its altitude relative to the sea level. This equation is known as the Barometric Formula which may be expressed as:

$$P=P_0 \exp(-gM(h-h_0)/(RT)).$$

In this equation: P0 is the reference pressure at h0, g is the gravitational acceleration of Earth (9.80665 m/s2), M is the molar mass of atmosphere (M=0.0289644 kg/mol), R is the universal gas constant (R=8.31432 Nm/(mol K), P is the pressure at altitude h. Using this equation, one can calculate h once P, P0 and h0 are known.

One issue however, is that under usual conditions an error of 0.1 hPa in P0 will result in an error of roughly 1 meter, which is less than the E911 standard of 3 meters.

According to an aspect of the present disclosure, our systems and methods employ at least 3 low-cost barometric pressure sensors, installed at different but known heights of $h_1$ $h_2$ and $h_3$. (For example on a utility pole with known height differences of 1 m as shown in the figure) Their corresponding barometric pressure measurements will be $P_1$, $P_2$ and $P_3$ respectively However, each of these measurements will have an inherent inaccuracy due to the limited accuracy of the sensors. But since their heights are known and fixed, and since all the sensors are at the same temperature value, one can calculate what the ratios of those pressure values would be if there were no error as follows:

$$R_{AB}=P_A/P_B=\exp(-gM(h_A-h_B)/(RT)).$$

Let us call the amount of error for each sensor as $\Delta p_1$, $\Delta p_2$, and $\Delta p_3$. These are the unknown errors in each measurement and the ideal (correct/absolute) pressure measurements would be:

$$P'_1 = P_1 + \Delta p_1, P'_2 = P_2 + \Delta p_2, \text{ and } P'_3 = P_3 + \Delta p_3$$

In this relationship, P' (P prime) values are the pressure values if there were no error in the sensors.

Our method is based on determining the minimum $\Delta p_1$, $\Delta p_2$, and $\Delta p_3$ values that give the minimum error in $R_{AB}$ values. This is done by calculating every possible combination of $\Delta p$ values in a search grid and which combination of them gives a best match to a theoretically expected values of P prime. Of course, the search grid will be kept within the error margin of the sensors. Note that mathematically this approach is identical to taking average of the measurements for the special case when $h_1 = h_2 = h_3$.

The error function can be defined as follows:

$$E = ((P_1 + \Delta p_1/P_2 + \Delta p_2) - R_{12})^2 + ((P_2 + \Delta p_2/P_3 + \Delta p_3) - R_{23})^2 + ((P_1 + \Delta p_1/P_3 + \Delta p_3) - R_{13})^2$$

One can make further improvements by averaging each sensor measurement over time as well. Once the optimum pressure values for each sensor are determined, any one of them can be chosen as the reference pressure (with the corresponding height and temperature) broadcasted to a central office via an acoustic modem, or to all the nearby cellphones by via wirelessly. And this reference pressure can be used for altitude calculations.

We again note particularly distinguishing aspects of our inventive method including: 1) using multiple low-cost pressure sensors with known heights instead of a single high-cost sensor; 2) finding the actual pressure value not by averaging multiple sensors but rather optimizing the expected error in each of them to make use of the fact that sensor heights are known—in other words, defining a new error function; 3) our approach is scalable, i.e. the number of sensors can be increased, and the multiple sensors can be grouped together into smaller cells. For example, 12 sensors can be split into 4 groups of 3 sensors. Each group can be corrected separately by using our method. And then the 4 groups can be corrected among themselves. And, as we have illustratively shown, our inventive system and method system can be integrated into a DFOS system with an acoustic modem and the distribution of a measured local pressure value may be conveyed via DFOS using the acoustic modem.

Figure 5:
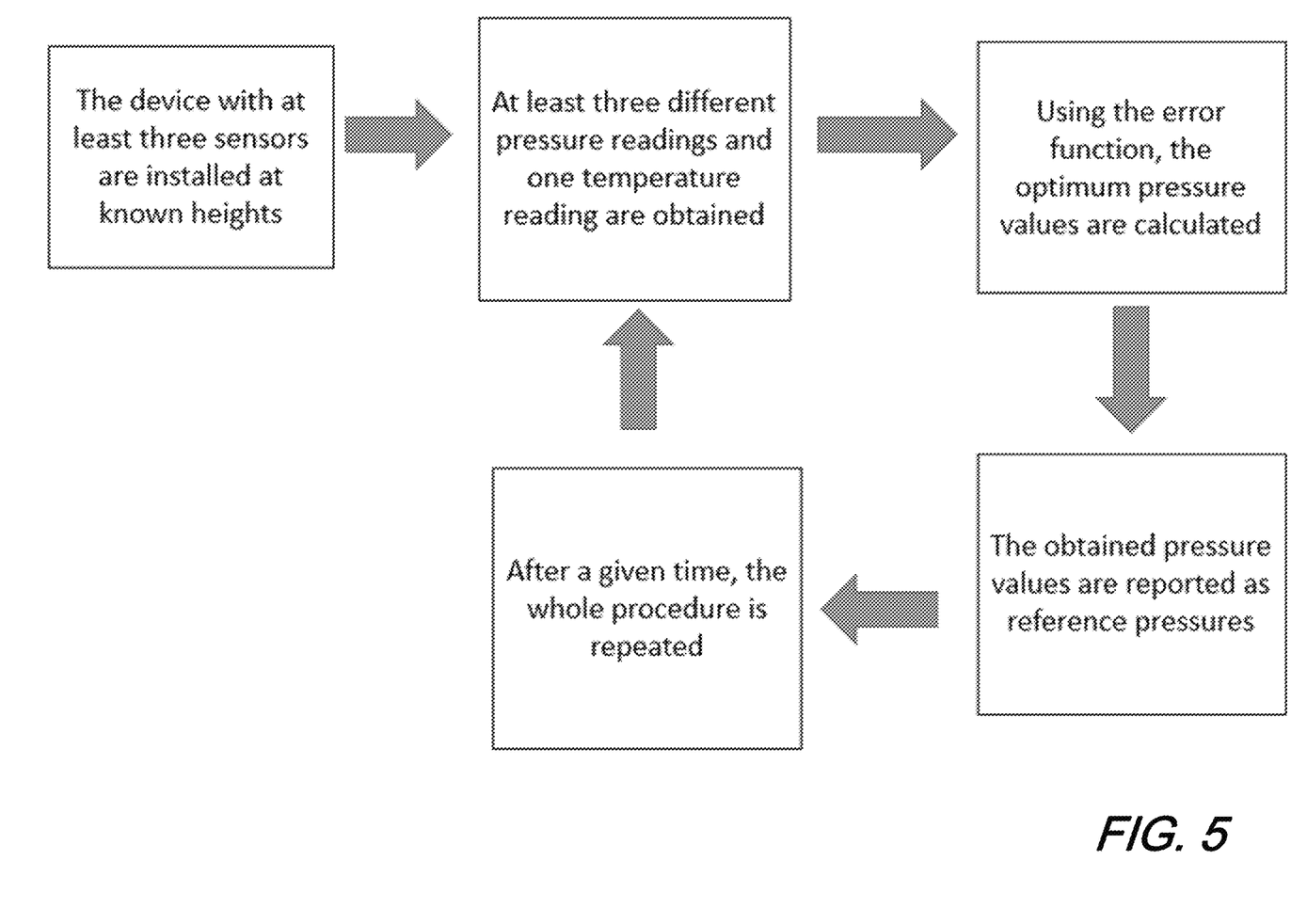
FIG. 5 is a schematic diagram showing illustrative flow of operations according to aspects of the present disclosure.

FIG. 5 is a schematic diagram showing illustrative flow of operations according to aspects of the present disclosure. With reference to that figure, an understanding of overall operation of our inventive method and systems may be understood. First, at least three sensors are installed at known heights. Such installations may be made outdoors or indoors, so long as the installation heights are known. Their relative heights are measured and recorded as h1, h2, h3, etc. Each sensor makes multiple pressure measurements and averages those results. Each sensor reports their pressure measurements to a local microprocessor board such as that depicted in the figures as P1, P2, and P3. By measuring the local temperature and using the h1, h2, h3 values, the R12, R13, R23 values are calculated. In a predefined 3D (for 3 sensors) search grid, for all combinations of $\Delta p$, the error function is calculated. The $\Delta p$ values that give the minimum error is selected and the P prime values are calculated and reported as the reference pressure.

Figure 6:
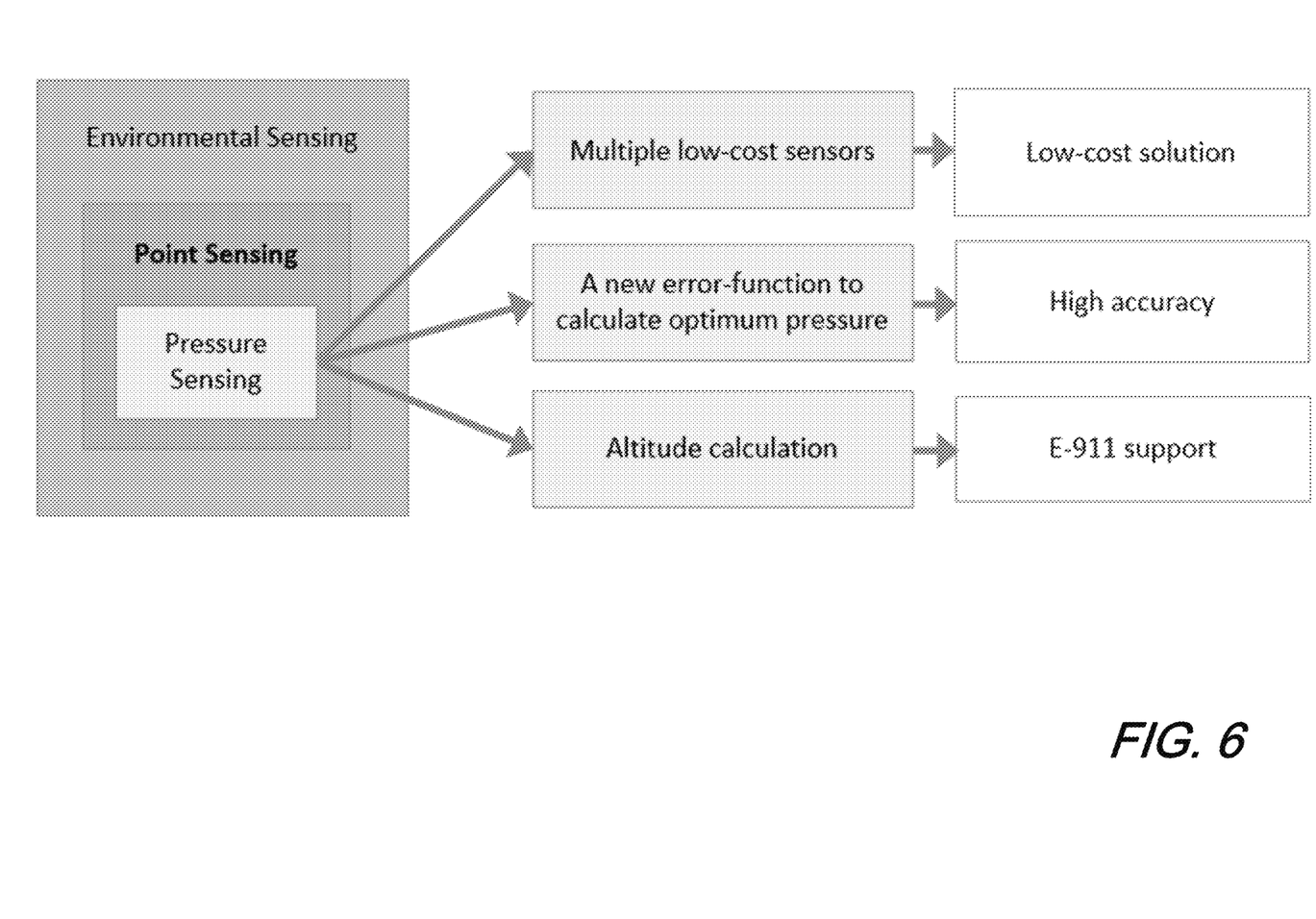
FIG. 6 is a schematic diagram showing illustrative features according to aspects of the present disclosure.

FIG. 6 is a schematic diagram showing illustrative features according to aspects of the present disclosure. As we have described, our inventive pressure sensing utilizes multiple, low-cost sensors; a new error function is used to determine an optimum pressure, and altitude (height) determination is made. As such, our inventive systems and methods provide a low-cost solution, with high-accuracy, facilitating the enhanced provision of 3D location services including E-911.

At this point, while we have presented this disclosure using some specific examples, those skilled in the art will recognize that our teachings are not so limited. Accordingly, this disclosure should be only limited by the scope of the claims attached hereto.

The invention claimed is:

1. A method for barometric pressure monitoring comprising:
   a) providing at least three barometric pressure sensors, each individual one of the at least three barometric pressure sensors installed at a different, known height;
   b) operating the at least three barometric pressure sensors to obtain at least three different barometric pressure measurements respectively, and at least one temperature measurement at the location of the at least three barometric pressure sensors;
   c) using a determined error function, determining an optimum pressure value for each individual one of the at least three barometric pressure sensors and generating a reference pressure value for each individual one of the at least three barometric pressure sensors;
   d) repeating steps b-c, above, to determine the barometric pressure at a given time.

2. A method for barometric pressure monitoring according to claim 1 wherein the determined error function is represented as:

$$E = ((P_1 + \Delta p_1/P_2 + \Delta p_2) - R_{12})^2 + ((P_2 + \Delta p_2/P_3 + \Delta p_3) - R_{23})^2 + ((P_1 + \Delta p_1/P_3 + \Delta P_3) - R_{13})^2$$

where
   $P_1$, $P_2$, and $P_3$ are the pressures at the least three barometric pressure sensors, respectively;
   $\Delta p_1$, $\Delta p_2$, and $\Delta p_3$ are error amounts for each individual one of the at least three barometric pressure sensors, respectively;
   $R_{12}$, $R_{23}$, and $R_{13}$ are the ratios of pressure values between the respective at least three barometric pressure sensors.

3. A method for barometric pressure monitoring according 2 further comprising:
   providing a distributed fiber optic pressure sensor (DFOS) system including a length of optical sensor fiber, an interrogator to optically interrogate the optical sensor fiber, and an analyzer to analyze backscattered signals received from the optical sensor fiber and determine vibrational activity at locations along the length of the optical fiber;
   operating the DFOS system to determine the vibrational activity at locations along the length of the optical fiber, said vibrational activity indicative of the barometric pressure determined at the given time.

4. A method for barometric pressure monitoring according 3 further comprising:
   providing an acoustic modem that receives the barometric pressure determined at the given time, and produces vibrations indicative of the pressure determined at the given time which are detected by the operational DFOS system.

* * * * *